United States Patent [19]

Tanaka et al.

[11] Patent Number: 4,823,255

[45] Date of Patent: Apr. 18, 1989

[54] METHOD OF CREATING PROGRAM FOR DRILLING HOLES

[75] Inventors: Kunio Tanaka; Yasushi Onishi, both of Tokyo, Japan

[73] Assignee: Fanuc Ltd, Minamitsuru, Japan

[21] Appl. No.: 2,673

[22] PCT Filed: Apr. 25, 1986

[86] PCT No.: PCT/JP86/00206

§ 371 Date: Dec. 19, 1986

§ 102(e) Date: Dec. 19, 1986

[87] PCT Pub. No.: WO86/06514

PCT Pub. Date: Nov. 6, 1986

[30] Foreign Application Priority Data

Apr. 30, 1985 [JP] Japan .................................. 60-92909
Apr. 30, 1985 [JP] Japan .................................. 60-92911

[51] Int. Cl.⁴ .................... B23Q 15/00; G05B 19/18; G05B 19/403

[52] U.S. Cl. .................................. 364/191; 364/474.21

[58] Field of Search ............................. 364/167-171, 364/191-193, 474, 475, 474.21; 29/568

[56] References Cited

U.S. PATENT DOCUMENTS

| | | | |
|---|---|---|---|
| 4,528,633 | 7/1985 | Sakai et al. | 364/474 |
| 4,547,854 | 10/1985 | Hashimoto et al. | 364/474 |
| 4,550,375 | 10/1985 | Sato et al. | 364/474 |
| 4,667,294 | 5/1987 | Shima et al. | 364/474 |

Primary Examiner—Clark A. Jablon
Attorney, Agent, or Firm—Staas & Halsey

[57] ABSTRACT

A method of creating a hole drilling program reduces the number of times tools are changed. The method includes the steps (a) a step of (a) creating a part program (P1-P3) for every hole of a different shape, each part program comprising records arranged in a machining process sequence and including a tool used (A-K); (b) finding a tool ("C") having the highest frequency of common use in the part programs (P1-P3); (c) separating each part program which includes the common tool ("C") as a tool used into an anterior part program section (Pi1, i=1, 2, ...) and a posterior part program section (Pi2, i=1, 2, ...) at the common the tool, and adopting the following tool selection sequence: tool group used in the anterior part program section precedes the common tool ("C") which precedes the tool group used in the posterior part program section; (d) deciding a tool selection sequence (A→B→F→H→I→C→D→G→E→J→K) by repeating the second and third steps for each anterior part program section (Pi1) and each posterior part program section (Pi2) until there are no more common tools; and (e) creating a combined part program comprising records arranged in the tool selection sequence.

9 Claims, 5 Drawing Sheets

FIG.1F   A → B → F → H → I → C → D → G → E → J → K

METHOD OF CREATING PROGRAM FOR DRILLING HOLES

FIELD OF THE INVENTION

This invention relates to a method of creating an NC program for drilling holes. More particularly, the invention relates to a method of creating an NC program for drilling holes in which a tool use sequence is decided in such a manner that the number of times tools are changed is made close to a minimum value while maintaining a tool use sequences specified by part programs created for each one of holes having different shapes, and the holes are drilled in the tool use sequence.

DESCRIPTION OF THE RELATED ART

An automatic programming apparatus which automatically creates NC programs for drilling holes is available. With such an automatic programming apparatus, data are entered in a conversational mode using a graphic display screen and an NC program for drilling holes is created from a design drawing through a simple operation.

Conventionally, an NC program for drilling holes is created in such a manner that a number of holes are divided into a plurality of groups classified by holes of the same shape (holes of an identical depth, size and type), and all holes constituting one group are drilled followed by drilling all holes in the next group. This process is performed in a similar manner thereafter until all holes are drilled.

Ordinarily, a plurality of tools are used to form a single hole. For example, a screw hole is formed by sequentially executing a center boring step using a center drill, a drilling step using a drill, a countersinking step using a countersink, and a tapping step using a tapper. Accordingly, taking into consideration solely the tool use sequence for each group, we have:

First group: $T_{11}, T_{12}, \ldots T_{1A}$
Second group: $T_{21}, T_{22}, \ldots T_{2B}$
m-th group: $T_{m1}, T_{m2}, \ldots T_{mM}$ where $T_\square$ represents the tool number. Some of the tools used to form the holes of one group are also used to form the holes of other groups. Accordingly, if the tool use sequence of tools employed in drilling the holes is skillfully decided, the number of times tools are changed can be made small to shorten machining time.

However, since the conventional arrangement is such that after the drilling of all holes constituting one group is completed, the holes of the next group are drilled, the same tool is selected a number of times. This leads to a large number of tool changes and prolongs machining time.

SUMMARY OF THE INVENTION

Accordingly, an object of the present invention is to provide a hole drilling program creation method through which the number of tool changes can be made small.

The present invention relates to a method of creating a program for drilling holes and has the following steps: creating a part program for every hole of a different shape, each part program comprising records arranged in a machining process sequence and including a tool used and machining depth; checking whether there are tools which can be used commonly for various types of hole machining and finding the tool having the highest frequency of common use; separating each part program, which includes the found common tool as a tool used, at the common tool into an anterior part program section and a posterior part program section, and adopting the following tool selection sequence: tool group used in the anterior part program section→common tool→tool group used in the posterior part program section; deciding a tool selection sequence by repeating the second and third steps for each anterior part program section and each posterior part program section until there are no more common tools, respectively; and creating a combined part program comprising records arranged in the tool selection sequence decided.

DESCRIPTION OF THE PREFERRED EMBODIMENT

FIG. 1 is a schematic explanatory view showing a method of creating an NC program for drilling holes in accordance with the present invention.

If a number of holes are divided into a plurality of groups classified according to holes of the same shape (holes of the same depth, size and type), there will be cases where a tool used in forming the holes of a certain group can also be used to form the holes in another group. In such case, if the machining using this common tool is performed successively in each group, then the number of times tools are changed can be reduced correspondingly (M−1) in comparison with the prior-art method, where M is the number of groups in which the common tool is among the tools used.

Figure 1A:
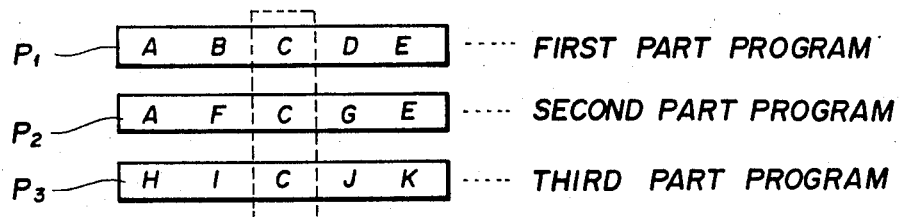
FIGS. 1(A)-1(E) are schematic explanatory views of the method of the present invention.

Accordingly, in the invention, first, second and third part programs P1–P3 are created for the holes of different shape, each part program comprising records arranged in a machining process sequence and including at least a tool used and machining depth [see FIG. 1(A)]. In FIG. 1, the alphabetic characters "A"–"K" may be thought of as records or as tools.

When creation of the first, second and third part programs P1–P3 is completed, it is checked whether there are tools which can be used commonly in each hole machining operation, and the tool used most commonly is found. In the example of FIG. 1(A), the tool "C" is that having the highest frequency of common use.

Figure 1B:
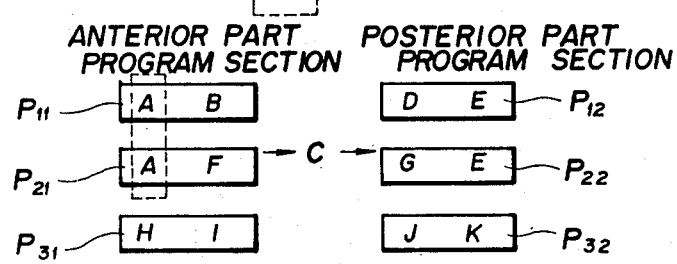
Figure 1C:
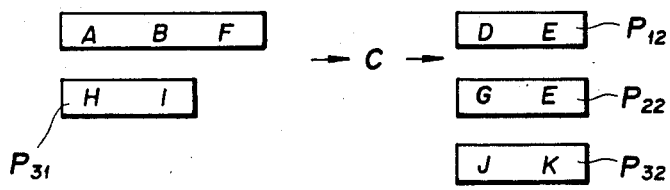

Next, each of the part programs P1–P3 which includes the found common tool "C" as a tool used is separated at the common tool into an anterior part program section Pi1 (i=1-3) and a posterior part program section Pi2 (i=1-3), and the following tool selection sequence is adopted: the tool group used in the anterior part program section Pi1 preeceds the common tool "C" which in turn precedes the tool gruop used in the posterior part program section Pi2 [see FIG. 1(B)].

Thereafter, the above steps are repeated for each anterior part program section Pi1 (i=1-3) and each posterior part program section Pi2 (i=1-3) until there are no longer common tools in the remaining part program sections. This results in the tool selection sequence (A→B→F→H →I) in the group of tools used in the anterior part program section Pi1 and the tool selection sequence (D →G→E→J→K) in the group of tools used in the posterior part program section Pi2 [see FIGS. 1(C)-1(E)].

Finally, the tool selection sequence
A→B→F→H→I→C→D→G→E→J→K
is decided for all tools used in all of the part programs P1-P3 having the common tool "C" [see FIG. 1(F)]. It should be noted that this tool selection sequence does not disrupt the tool use sequence for each hole, namely the tool use sequence in each of the part programs P1-P3 illustrated in FIG. 1(A).

Next, a combined part program is created comprising the records arranged in the above tool selection sequence.

If a part program which does not include the common tool "C" exists, processing B1 is applied to this part program and the combined part program to decide a tool selection sequence for all hole machining operations, and a drilling program is created comprising records arranged in the resulting tool section sequence.

Figure 2:
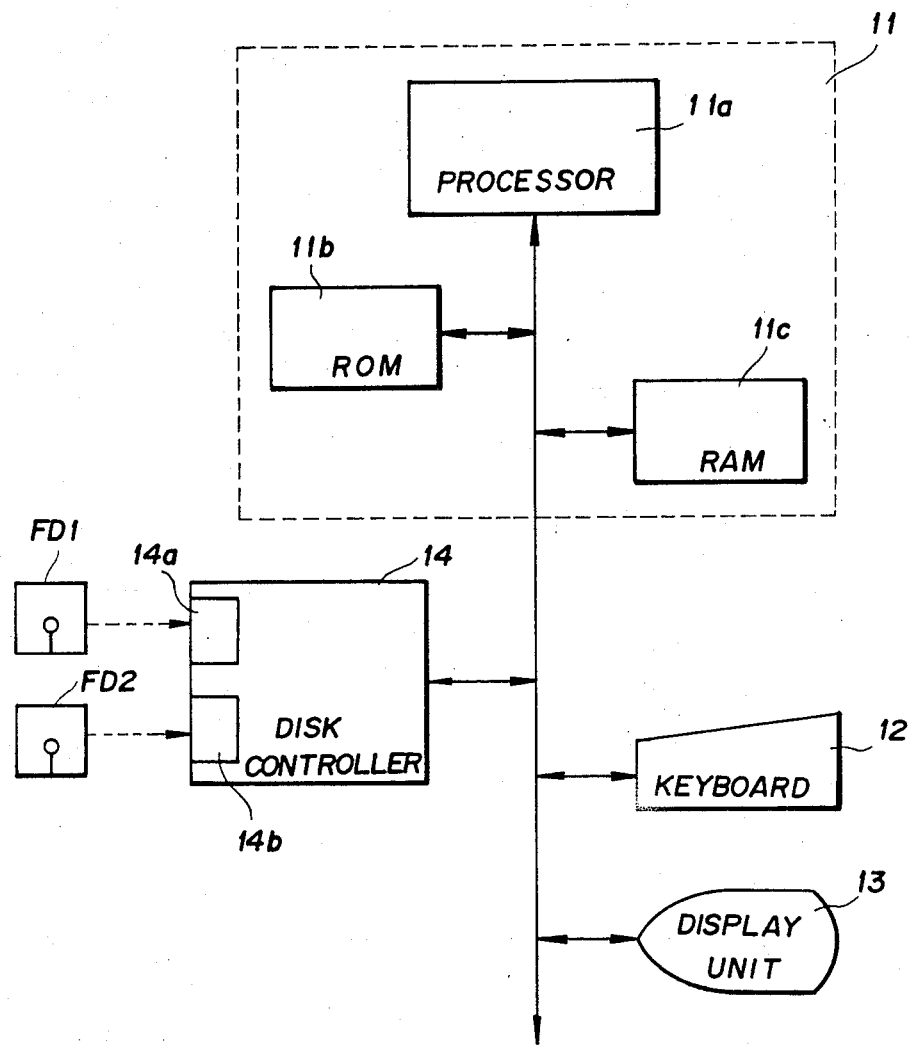
FIG. 2 is a block diagram of an automatic programming apparatus to which the present invention can be applied.

FIG. 2 is a block diagram of an automatic programming apparatus to which the present invention can be applied. In FIG. 2, numeral 11 denotes a mainframe computer having a processor 11a, ROM 11b and RAM 11c. Numeral 12 denotes a keyboard, 13 a display unit and 14 a disk controller for controlling two floppy disk drives 14a, 14b. Though not shown, a printer, data reader/puncher, magnetic tape unit and other input-/output units are suitably connected to the above. The automatic programming apparatus can be made to perform processing for creating a hole drilling NC program if a floppy FD1 storing a system program for NC program creation is set in the floppy disk drive FD1 before automatic programming is executed, followed by starting a loading program stored in the ROM 11b to read the loading program into the RAM 11c. The created NC program for drilling is preserved on the floppy FD2.

Figure 3:
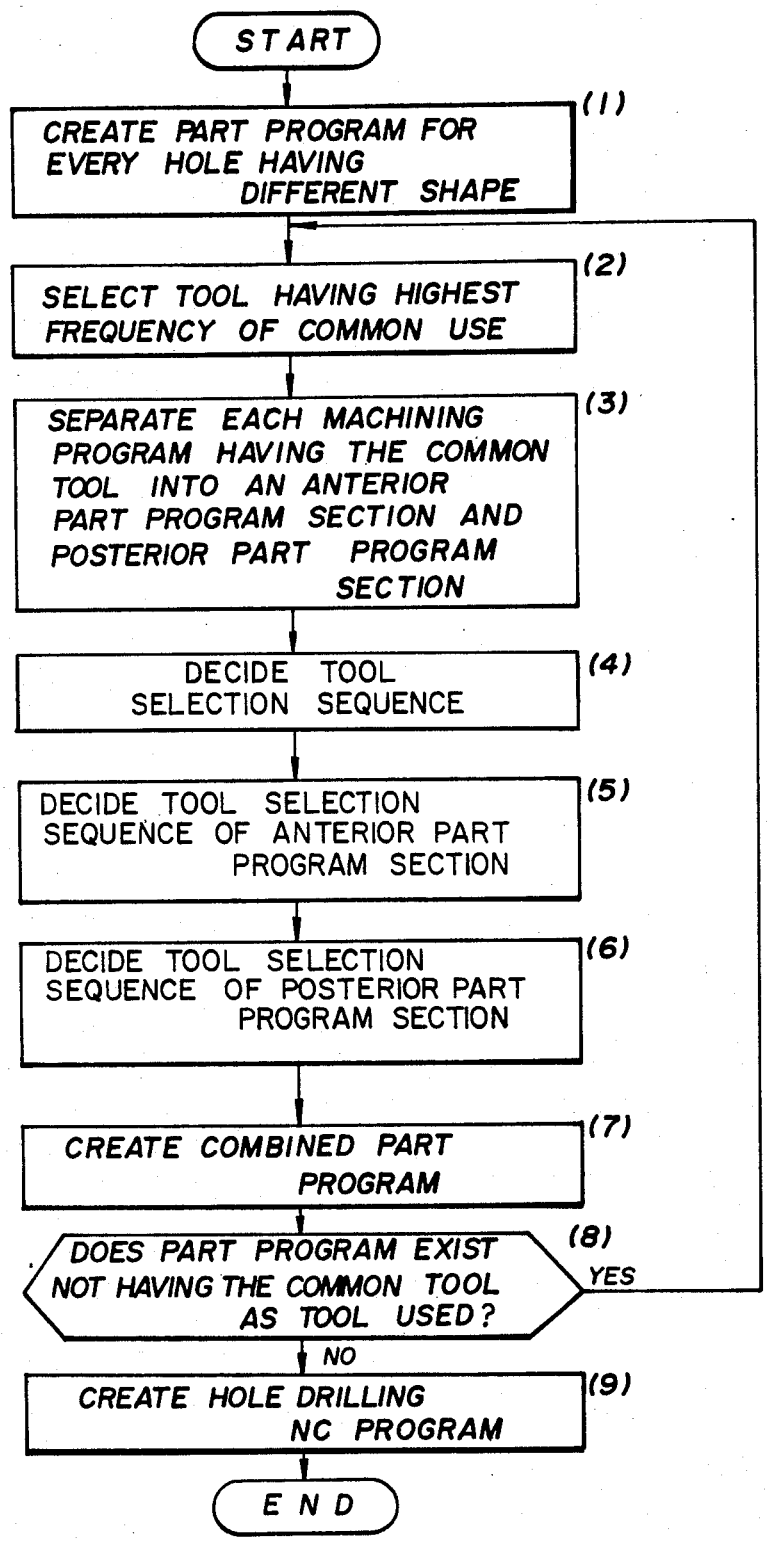
FIG. 3 is a flowchart of processing according to the present invention.

Processing for creating the drilling NC program in accordance with the invention will now be described in accordance with the flowchart of FIG. 3.

(1) A part program is created for every hole having a different shape. The part program is created by the following processing, which serves as an example:

(a) First, a machining process for cutting a hole having a predetermined shape is selected. For example, if the hole is a screw hole, the hole will be cut in the following sequence: center boring, drilling, countersinking and tapping. Therefore, center boring is selected first.

(b) Next, the tool number of a tool used in the hole cutting process selected in step (a) is inputted. It should be noted that a suitable tool can be decided automatically based on the hole dimensions.

(c) Following the entry of the tool number, such information as the depth to which the hole is to be cut by the tool is inputted.

(d) Next, it is checked whether all machining processes have been specified. If all processes have not been specified, then processing from step (a) onward is repeated.

(e) When all machining processes have been specified, hole position is inputted. If holes of the same shape and depth are plural in number, the positions of all of these holes are inputted.

(f) Thereafter, it is checked whether there are holes having other shapes. If there are such holes, the processing from step (a) onward is performed. Eventually, a part program will be created for every hole having a different shape.

Figure 4:
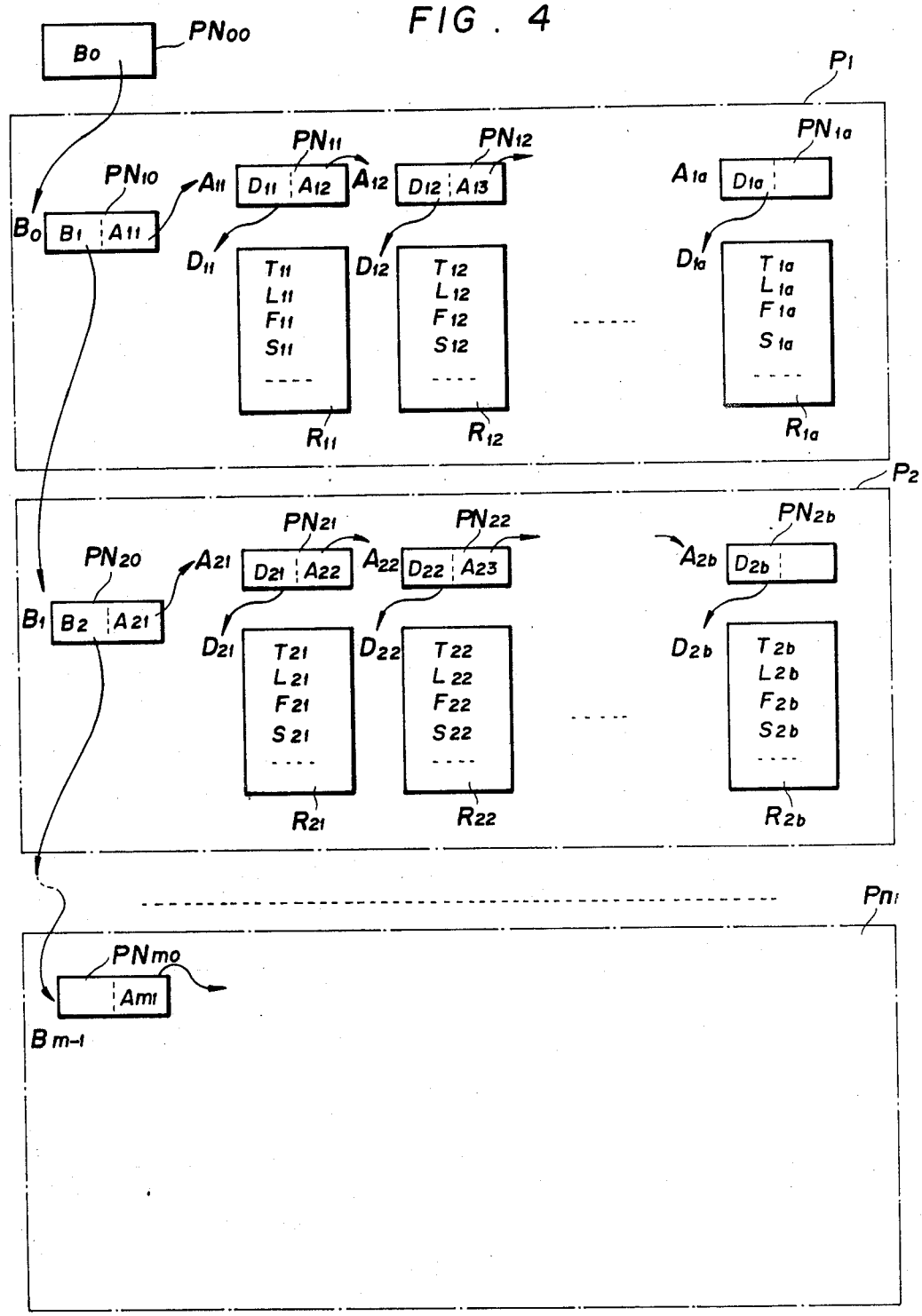
FIG. 4 is a part program explanatory view.

FIG. 4 is an explanatory view of part programs. Pi (i=1, 2, ...) represents an i-th part program, Rij (i=1, 2, ...; j=1, 2, ...;) denotes a record, and PNij stands for a point register for storing two types of pointers. Each record Rij is composed of a tool number Tij, cutting depth (hole depth) Lij, tool feedrate Fij, spindle rotating, speed Sij, etc. The pointers are a pointer for designating the address Dlj of record Rij and a pointer for designating the address Aij+1 of the pointer register PNij+1. A pointer register PNoo designates an address Bo of a pointer register PN10 of the first part program Pl, the first pointer of the pointer register PN10 designates an address Bl of a pointer register PN20 of the posterior part program P2, and a second pointer of the pointer register PN10 designates an address All of a pointer register PN11.

The first hole part program Pl is composed of L pointer registers P10, PN11-PN1$n$ and records R11-Rl$a$. The first pointer of pointer register PN1j (j=1, 2, ...) designates the first address Dlj (or record number) of record R1j. The second pointer of pointer register PN1j designates the address of the pointer register corresponding to the record of the next machining process. Accordingly, in the example of FIG. 4, the first part program Pl commands that the tools be used in the sequence
T11, T12, ... Tla
to cut a hole by the first through a-th machining processes. Operation is similar for the second, third ... m-th part programs.

(2) When creation of the part programs for the holes of different shapes is completed, the tool most commonly used in these part programs is obtained. Let M be the total number of part programs. If there is a tool used commonly in all M part programs, this is the tool obtained. If a tool used commonly in all M part programs does not exist, a search is conducted for a tool used in (M-1)-number of part programs. The tool having the highest frequency of common use is thus determined.

(3) Next, each part program which includes the common tool T1c as a tool used is separated at the common tool into an anterior part program section and a posterior part program section.

(4) The following tool selection sequence is adopted: the tool group used in the anterior part program section preceeds the common tool T1c which precedes the tool group used in the posterior part program section. For example, if there are two part programs and the tool uses sequences of the respective part programs are
T11, T12, T13 ... T1i, T1c, T1(i+1), ... T1n
T21, T22, T23 ... T2i, T1c, T2(i+1), ... T2m then
T1c is the common tool, T11-T1i, T21-T2j are the groups of tools used in the anterior part program sections, and Tl(i+l)-T1n, T2(j+1)-T2m are the groups of tools used in the posterior part program sections.

(5) Thereafter, a tool selection sequence for the tool groups used in the anterior part program sections is decided by repeating steps (2) through (4) until tools common to the anterior part program sections no longer exist.

(6) Next, a tool selection sequence for the tool groups used in the posterior part program sections is decided by repeating steps (2) through (4) until tools common to the posterior part program sections no longer exist.

Thus, a tool selection sequence for tools contained in all of the part programs having the tool T1c as a common tool is decided. It should be noted that this tool use sequence does not disrupt the tool use sequence for each hole specified by a corresponding part program.

(7) When a tool selection sequence has been decided in the above manner, a combined part program is created by rearranging the records Rij (FIG. 4) in that tool selection sequence. It should be noted that the rearranging of the records is performed by rearranging the sequence of addresses in the pointer registers storing pointers indicating the starting positions (or record numbers) of the records, without altering the storage location of each record.

(8) Next, it is checked whether part programs exist that do not possess the common tool T1c as a tool to be used. If such a part program exists, processing from step (2) onward is repeated by using this part program (not limited to a single part program) and the combined part program.

Figure 5:
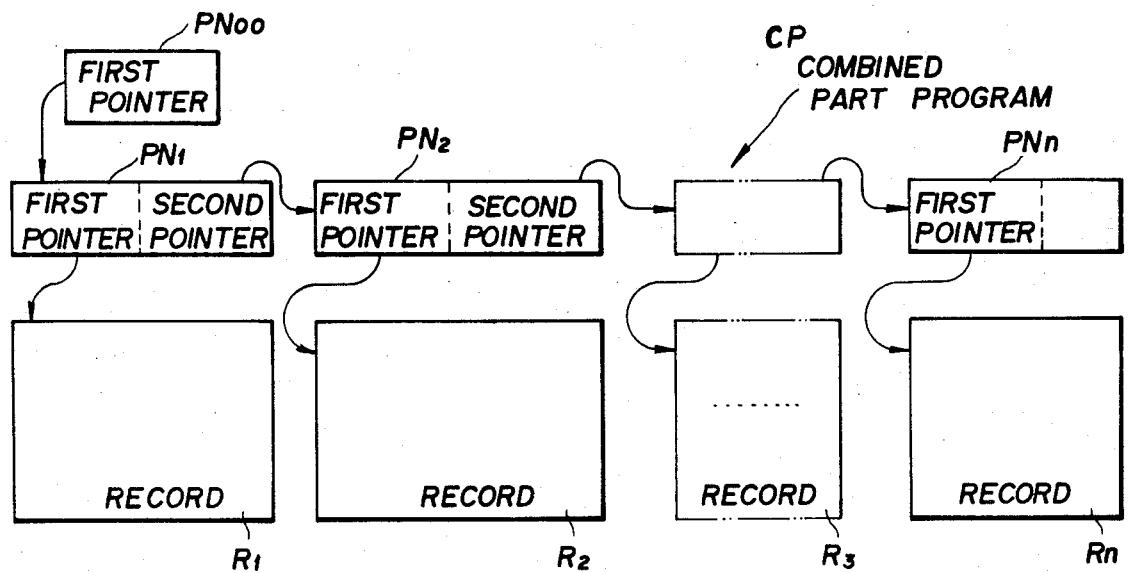
FIG. 5 is a combined part program explanatory view.

(9) If a part program not having the common tool T1c as the tool used does not exist, then processing for automatically deciding the tool use sequence ends, after which the NC program for drilling holes is created by using the combined part program and hole position data. As shown in FIG. 5, the final combined part program is a continuous row of the records Ri (i=1, 2, ...), which specify the respective hole machining processes, mixed in the order of tool use. The order of the machining processes (records) stored in the row is specified by the second pointer of the pointer registers PNi.

Thus, processing for creating a hole drilling NC program may be classified broadly into the following steps:

(A) a step of creating a part program for every hole of a different shape;

(B) a step of automatically deciding a tool selection sequence for tools used in machining all holes; and (C) a step of creating an NC program for drilling holes in accordance with the tool selection sequence. Each part program and the combined part program shown in FIGS. 4 and 5 are stored in the floppy FD2 or RAM 11c upon completion of processing for creating the hole drilling NC program.

Let us now describe the present invention in detail with reference to FIG. 1. Assume that the tool use sequences of the first, second and third part programs P1, P2 and P3 are respectively as follows [see FIG. 1(A)]:

P1: A, B, C, D, E
P2: A, F, C, G, E
P3: H, I, C, J, K

Since the tool "C" is used in all of the part programs P1–P3, the tool C is identified as the common tool by the processing of the second step described above. As a result, in step 3, the anterior part program sections P11, P21, P31 are respectively as follows:

P11: A, B
P21: A, F
P31: H, I and the posterior part program sections P21, P22, P32 are respectively as follows:

P21: D, E
P22: G, E
P32: J, K

Further, the tool selection sequence is as follows, in accordance with the fourth step [see, FIG. 1(B)]:

[A, B: A, F: H, I]proceeds C which precedes [D, E: G, E: J, K]

When processing from the second step onward is performed for the anterior part program sections in accordance with the fifth step, the tool A is found to be the tool whose common use is most frequent. Accordingly, the tool selection sequence for the anterior part program sections P11, P21 is as follows [FIG. 1(C)]:

A→B→F (or A→F→B)

Figure 1D:
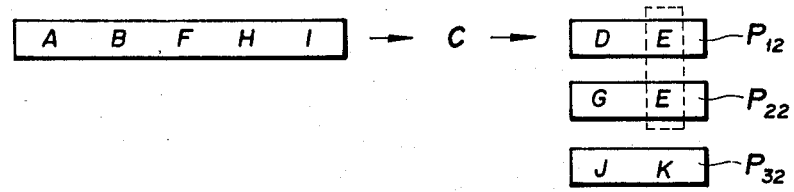

Since the combined tool selection sequence (A→B→F) of the anterior part program sections P11, P21 and the anterior part program section P31 do not have a tool in common, the final tool use sequence for all of anterior part program sections is as follows [FIG. 1(D)]:

A→B→F→H→I (or H→I→A→B→F)

Figure 1E:
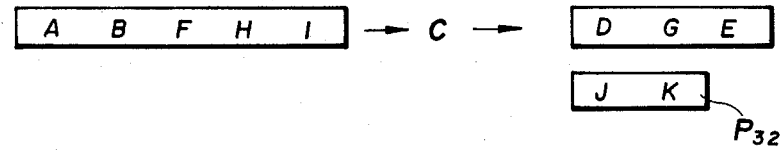

Similarly, the tool selection sequence for the section part program sections is as follows [FIGS. 1(E), (F)]:

D→G→E→J→K (or J→K→D→G→E)

The tool selection sequence for machining all of the holes is as follows:

A→B→F→H→I→C→D→G→E→J→K

Thus, tools are changed ten times. A total of 14 tool changes is required in the conventional method.

Figure 6:
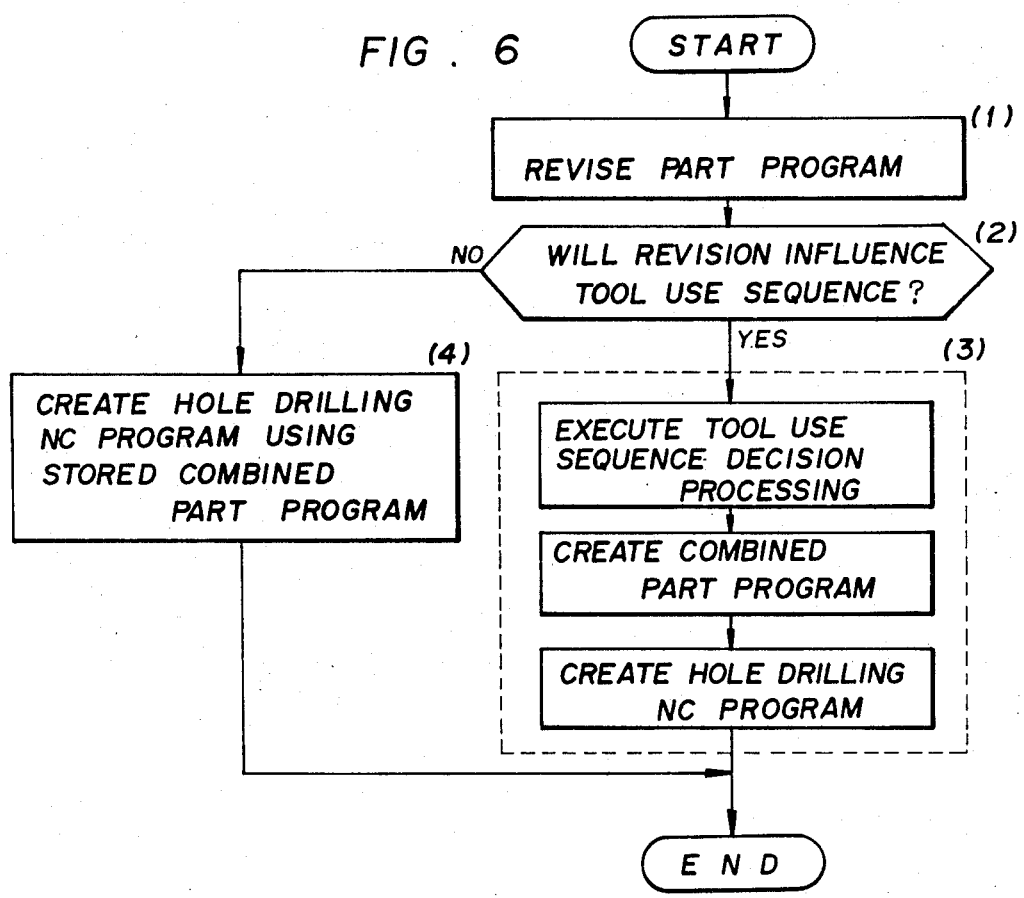
FIG. 6 is an explanatory view of processing for revising a hole drilling program.

There are cases where it is desired to revise the hole drilling NC program created through the above-described method. For example, there may be a case where a programming error is discovered by tape check processing performed after the program has been created, or where it is desired to read out and partially revise an already created hole drilling NC program in order to create a new hole drilling NC program. Such revision processing will now be described in accordance with the flowchart of FIG. 6.

(1) A part program Pi (see FIG. 4) is designated through programming method, the contents of a desired record Rij are modified, the desired record is deleted or a new record is added.

(2) When revision processing ends, a check is performed to determine whether the revision is one which would have an effect upon the tool use sequence.

A change in a tool used, addition of a tool used (addition of a new record) and deletion of a tool used (deletion of a record) are revisions that have an effect upon the tool use sequence, while revisions of feedrate, spindle rotating speed, hole depth, hole position and the like have no influence upon the tool use sequence.

(3) If a revision will have an effect upon the tool use sequence, then a new hole drilling NC program is created by performing the processing of steps (2)–(9) of the above-described hole part program creation processing, namely the processing for automatically deciding the tool selection sequence, processing for creating a new combined part program, processing for creating a hole drilling NC program, etc., using all part programs including the revised part program.

(4) If the revision will have no effect upon the tool use sequence of any of the part programs then a new hole drilling NC program conforming to the revision is created without performing the processing for automatically determining tool use sequence. In other words, a new hole drilling NC program is created using the combined part program of FIG. 5 (in which the contents of a desired record are revised by the processing of the first step).

In accordance with the present invention, the number of times tools are changed is reduced to shorten machining time.

In addition, since the arrangement is such that a hole part program is created by rearranging pointers, which designate the storage locations of respective records, in the tool selection sequence, processing for modifying the tool use sequence can be performed in a short period of time.

Further, even if a created hole drilling program has been revised, in accordance with the invention it is determined whether the revision is one which would influence a tool use sequence. If the revision is one which would influence the tool use sequence, a hole drilling NC program is created by performing processing for determining a tool selection sequence using the revised part program. If the revision is one which would not influence a tool use sequence, a new hole drilling NC program is created without performing processing for determining tool selection sequence. This makes it possible to minimize the number of times tools are changed and to perform revision processing, which does not have an effect upon wing use sequence, in a short period of time.

What is claimed is:

1. A method of creating a hole drilling program in an automatic programming apparatus, comprising the steps of:
   (a) creating a part program for every hole of a different shape, each part program comprising records arranged in a machining process sequence and including at least one tool used and machining depth, the part program specifying a tool use sequence for the hole;
   (b) automatically determining a tool selection sequence to bring a number of times tool are changed close to a minimum value while the tool use sequence specified by each part program is maintained;
   (c) creating a combined part program comprising said records arranged in the tool selection sequence determined in step (b); and
   (d) creating a hole drilling numerical control program using said combined part program.

2. A method of creating a hole drilling program according to claim 1, wherein step (b) comprises the steps of:
   (b1) checking whether one of the tolls is used commonly in machining of each hole and finding a common tool having a highest frequency of common use;
   (b2) separating each part program having said common tool into an anterior part program section and a posterior part program section preceding and following, respectively, said common tool;
   (b3) adopting as the tool selection sequence an anterior tool group used in the anterior part program section of all part programs having said common tool, followed by said common tool followed by a posterior tool group used in the posterior part program section of all the part programs having said common tool in common;
   (b4) repeating steps (b1)–(b3) for the anterior part program section and the posterior part program section of all the part programs having said common tool in common until there are no more common tools; and
   (b5) determining the tool selection sequence used in all the part programs having same common tool in common.

3. A method of creating a hold drilling program according to claim 2 wherein when any of the part programs are identified as excluding said common tool in step (b1), step (b) further comprises the steps of:
   (b6) deciding a new tool selection sequence for all holes by performing steps (b1)–(b5) using all of the part programs excluding use of said common tool and said combined machining program; and
   (b7) creating a combined part program comprising records arranged in the new tool selection sequence.

4. A method of creating a hole drilling program according to claim 3, wherein step (c) comprises creating the combined part program by reassigning first pointers designating storage locations of the records to follow the tool selection sequence 5. A method of creating a hole drilling program according to claim 4, wherein step (c) further comprises reassigning second pointers designating storage locations of the first pointers.

6. A method of creating a hole drilling program according to claim 2, wherein step (c) comprises creating the combined part program by reassigning first pointers designating storage locations of the records to follow the tool selection sequence.

7. A method of creating a hole drilling program according to claim 6, wherein step (c) further comprises reassigning second pointer designating storage locations of the first pointers.

8. A method of creating a hole drilling program, comprising the steps of:
   (a) creating a part program for every hole of a different shape, each part program comprising records arranged in a machining process sequence and including at least one tool used and machining depth, the part program specifying a tool use sequence for the hole;
   (b) automatically determining a tool selection sequence to bring a number of times tools are changed close to a minimum value while the tool use sequence specified by each part program is maintained;
   (c) creating a combined part program comprising said records arranged in the tool selection sequence determined in step (b);
   (d) creating a hole drilling numerical control program using said combined part program;
   (e) revising at least one of the records in at least one part program;
   (f) determining whether said (revision is one which)revising in step (e) would have an effect upon the tool use sequence of the at least one part program revised in step (e);
   (g) creating a new hole drilling program by performing step (b) to determine a new tool one part program revised in step (e) is determined in step (f) to have an effect upon the tool use sequence of the at least one part program; and
   (h) creating the new hole drilling program without performing step (b) to determine the new tool selection sequence if said revising in step (e) is determined in step (f) to have any effect upon the tool use sequence of the at least one part program 9. A method of creating a hole drilling program according to claim 8, wherein step (f) comprises determining that said revising in step (e) affects the tool use sequence of the at least one part program is said revising includes at least one of modification of (a) the tool used, addition of a different tool used and deletion of (a) the tool used in the at least one part program.

* * * * *

UNITED STATES PATENT AND TRADEMARK OFFICE
CERTIFICATE OF CORRECTION

PATENT NO. : 4,823,255

DATED : April 18, 1989

INVENTOR(S) : Tanaka et al.

It is certified that error appears in the above-identified patent and that said Letters Patent is hereby corrected as shown below:

```
FRONT PAGE, [57] ABSTRACT, line 3, delete "(a) a step";
                  line 12, "the tool," should be --tool,--;
                  line 13, after "sequence:" insert --the--.

Col. 1, line 12, "sequences" should be --sequence--;
Col. 2, line 15, "1(E)" should be --1(F)--;
        line 67, "gruop" should be --group--.
Col. 3, line 23, "B1" should be --similar to that used for
                  the anterior and posterior part program
                  sections--;
        line 27, "section" should be --selection--.
Col. 4, line 17, "D1j" should be --Dij--; and
        line 17, "of record" should be --of the record--;
        line 41, "tool into" should be --tool T1c into--;
        line 58, "uses" should be --use--.
Col. 6, line 5, "I]proceeds" should be --I] precedes--;
        line 41, after "through" insert
                  --a conversational--;
        line 63, "programs" should be --programs,--.
Col. 7, line 24, "wing" should be --any tool--;
        line 49, "tolls" should be --tools"--;
        line 60, "tool" (2nd occ.) should be --tool,--.
```

Page 1 of 2

UNITED STATES PATENT AND TRADEMARK OFFICE
CERTIFICATE OF CORRECTION

PATENT NO. : 4,823,255

DATED : April 18, 1989

INVENTOR(S) : Tanaka et al.

It is certified that error appears in the above-identified patent and that said Letters Patent is hereby corrected as shown below:

COL. 8, ALL LINES ARE INCORRECTLY NUMBERED.

Col. 8, line 4, "hold" should be --hole--;
line 5, "2" should be --2,--;
line 19, "sequence" should be --sequence.--;
line 31, "pointer" should be --pointers--;
line 53, delete "(revision is one";
line 54, delete "which)";
line 58, "tool one" should be --tool selection sequence using the at least one--;
line 59, "(e) is" should be --(e) if said revising in step (e) is--;
line 65, after "to" insert --not--;
line 66, "progrom" should be --program.--;
line 70, "is said" should be --if said--;
line 71, "of (a) the" should be --of the--;
line 72, "of (a) the" should be --of the--;

Signed and Sealed this

Thirtieth Day of January, 1990

*Attest:*

JEFFREY M. SAMUELS

*Attesting Officer*     *Acting Commissioner of Patents and Trademarks*